United States Patent
Richards (10) Patent No.: US 9,656,272 B1
(45) Date of Patent: May 23, 2017

(54) PRECIOUS METAL SEPARATION

(71) Applicant: Jarrod Richards, Grand Junction, CO (US)

(72) Inventor: Jarrod Richards, Grand Junction, CO (US)

( * ) Notice: Subject to any disclaimer, the term of this patent is extended or adjusted under 35 U.S.C. 154(b) by 0 days.

(21) Appl. No.: 14/708,469

(22) Filed: May 11, 2015

Related U.S. Application Data (60) Provisional application No. 61/991,947, filed on May 12, 2014.

(51) Int. Cl.
| | |
|---|---|
| *B03C 1/00* | (2006.01) |
| *B03C 1/30* | (2006.01) |
| *B03C 1/20* | (2006.01) |
| *B65G 37/00* | (2006.01) |

(52) U.S. Cl.
CPC ............... *B03C 1/30* (2013.01); *B03C 1/20* (2013.01); *B65G 37/00* (2013.01); *B03C 2201/20* (2013.01)

(58) Field of Classification Search
CPC ......... B07B 11/06; B07B 13/14; B07B 13/16; B07B 13/18; B07B 13/113; B03C 1/20; B03C 1/26; B03C 1/30
USPC ........................................ 209/219, 284, 368
See application file for complete search history.

(56) References Cited

U.S. PATENT DOCUMENTS

| | | | | |
|---|---|---|---|---|
| 3,108,950 A | * | 10/1963 | Buckley | B03B 4/02 209/20 |
| 3,539,001 A | * | 11/1970 | Binnix | B03B 4/005 209/475 |
| 3,777,887 A | * | 12/1973 | Johnston | B03B 4/065 209/474 |
| 2005/0173308 A1 | * | 8/2005 | Kelsey | B03B 4/02 209/155 |
| 2013/0264248 A1 | * | 10/2013 | Smolkin | B03C 1/18 209/214 |

* cited by examiner

*Primary Examiner* — Joseph C Rodriguez
*Assistant Examiner* — Kalyanavenkateshware Kumar
(74) *Attorney, Agent, or Firm* — Brownstein Hyatt Farber Schreck, LLP (57) ABSTRACT

A system for precious metal separation includes a feeder that provides a granular mixture to a precious metal separator device. The feeder includes an inlet port, a storage area, and an outlet port. The feeder provides the granular mixture to the precious metal separator device at a rate at which the precious metal separator device processes the granular material. As the feeder provides the granular mixture to the precious metal separator, a remover removes ferromagnetic material from the provided granular mixture before the provided granular mixture reaches the precious metal separator.

20 Claims, 5 Drawing Sheets

PRECIOUS METAL SEPARATION

CROSS-REFERENCE TO RELATED APPLICATION

This application is a nonprovisional patent application of and claims the benefit of U.S. Provisional Patent Application No. 61/991,947, filed May 12, 2014 and titled "Precious Metal Separation," the disclosure of which is hereby incorporated herein by reference in its entirety.

TECHNICAL FIELD

This disclosure relates generally to precious metal separation, and more specifically to systems, methods, and apparatuses for precious metal separation.

BACKGROUND

Many precious metals (such as gold, silver, copper, and platinum) occur naturally in the environment. In many cases, such precious metals are found in a granular mixture (and/or in ore, circuit boards, and/or other forms that may then be ground down to a granular mixture) with various nonprecious materials such as sand, dirt, and so on. In order to utilize the precious metals found in such a granular mixture, such precious metals may have to be separated from the nonprecious materials in the granular mixture.

Various separator devices exist for separating precious metals from such a granular mixture. Examples of such separator devices include shaker tables, blue bowls, sluice boxes, gold pans, and so on.

SUMMARY

The present disclosure discloses systems and methods for precious metal separation. A system for precious metal separation may include a feeder that provides a granular mixture to a precious metal separator device. The feeder may include an inlet port, a storage area, and an outlet port. The feeder may provide the granular mixture to the precious metal separator device at a rate at which the precious metal separator device processes the granular material. As the feeder provides the granular mixture to the precious metal separator, a remover may remove ferromagnetic material from the provided granular mixture before the provided granular mixture reaches the precious metal separator.

In some implementations, the outlet port may be a rotating tube that may be angled downward. The rotation speed and/or angle of the tube may be adjustable to control the rate at which the granular mixture is dispensed.

In various implementations, the provided granular material may fall from the outlet port to the precious metal separator device. In such implementations, the remover may horizontally and/or otherwise attract the ferromagnetic material to a surface of the remover from the provided granular mixture as it falls. Such attraction may be magnetic and the remover may include a number of rotating magnets, the rotation speed of which may be adjustable. The rotating magnets may rotate at such a speed that attracted ferromagnetic material is pulled along the surface until scraped from the surface by a scraper, such as a ramp, that directs the released ferromagnetic material into a collector. The amount of ferromagnetic material removed by the remover may be dependent on the distance of the surface to the falling dispensed granular mixture, the speed of the magnet rotation, and so on. Any of these factors may be adjustable.

In one or more implementations, the precious metal separator device may be a shaker table. Such a shaker table may be moveably mounted to a support frame such that the shaker table is operable to move in a first direction at a first speed, experience one or more impacts, and move in a second direction at a second speed. The first and second directions may be opposing directions and the first speed may exceed the second speed. In some cases, the shaker table may be moveably mounted to the support frame by one or more rails and pillow bearing blocks.

In various embodiments, a system for precious metal separation may include a feeder that provides a granular mixture to a precious metal separator device. The feeder may include an inlet port, a storage area connected to the inlet port; and an outlet port connected to the storage area. The feeder may provide the granular mixture to the precious metal separator device at a rate that the precious metal separator device processes the granular mixture.

In one or more embodiments, a system for precious metal separation may include a feeder that drops a granular mixture onto a precious metal separator device and a remover that removes ferromagnetic material from the dropping granular mixture. The remover may include a surface and a number of rotating magnetic elements positioned underneath the surface that magnetically attract ferromagnetic material in the dropping granular mixture.

In some embodiments, a method for feeding a precious metal separator device includes: receiving a granular mixture at an inlet port of a feeder; dispensing the granular mixture at an outlet port of the feeder by dropping the granular mixture onto a precious metal separator device at a rate that the precious metal separator device processes the granular mixture; and removing ferromagnetic material from the dropping granular mixture by magnetically attracting the ferromagnetic material horizontally to a surface of a remover.

Various other embodiments may include a system for precious metal separation, a method for precious metal separation, a system for feeding a precious metal separator device, a precious metal separator device, a shaker table, a feeder for a precious metal separator device, a magnetic material remover for removing magnetic material from a granular mixture being fed to a precious metal separator device, a method for removing magnetic material from a granular mixture being fed to a precious metal separator device, a method for feeding a precious metal separator device, and/or a method for moveably mounting a shaker table to a support frame.

It is to be understood that both the foregoing general description and the following detailed description are for purposes of example and explanation and do not necessarily limit the present disclosure. The accompanying drawings, which are incorporated in and constitute a part of the specification, illustrate subject matter of the disclosure. Together, the descriptions and the drawings serve to explain the principles of the disclosure.

DETAILED DESCRIPTION

The description that follows includes sample systems, apparatuses, and methods that embody various elements of the present disclosure. However, it should be understood that the described disclosure may be practiced in a variety of forms in addition to those described herein.

The present disclosure discloses systems and methods for precious metal separation. A system for precious metal separation may include a feeder that provides a granular mixture to a precious metal separator device. The feeder may include an inlet port, a storage area, and an outlet port. The feeder may provide the granular mixture to the precious metal separator device at a rate at which the precious metal separator device processes the granular material. As the feeder provides the granular mixture to the precious metal separator, a remover may remove ferromagnetic material from the provided granular mixture before the provided granular mixture reaches the precious metal separator.

In some implementations, the outlet port may be a rotating tube that may be angled downward. The rotation speed and/or angle of the tube may be adjustable to control the rate at which the granular mixture is dispensed.

In various implementations, the provided granular material may fall from the outlet port to the precious metal separator device. In such implementations, the remover may horizontally and/or otherwise attract the ferromagnetic material to a surface of the remover from the provided granular mixture as it falls. Such attraction may be magnetic and the remover may include a number of rotating magnets, the rotation speed of which may be adjustable. The rotating magnets may rotate at such a speed that attracted ferromagnetic material is pulled along the surface until scraped from the surface by a scraper, such as a ramp, that directs the released ferromagnetic material into a collector. The amount of ferromagnetic material removed by the remover may be dependent on the distance of the surface to the falling dispensed granular mixture, the speed of the magnet rotation, and so on. Any of these factors may be adjustable.

In one or more implementations, the precious metal separator device may be a shaker table. Such a shaker table may be moveably mounted to a support frame such that the shaker table is operable to move in a first direction at a first speed, experience one or more impacts, and move in a second direction at a second speed. The first and second directions may be opposing directions and the first speed may exceed the second speed. In some cases, the shaker table may be moveably mounted to the support frame by one or more rails and pillow bearing blocks.

Figure 1A:
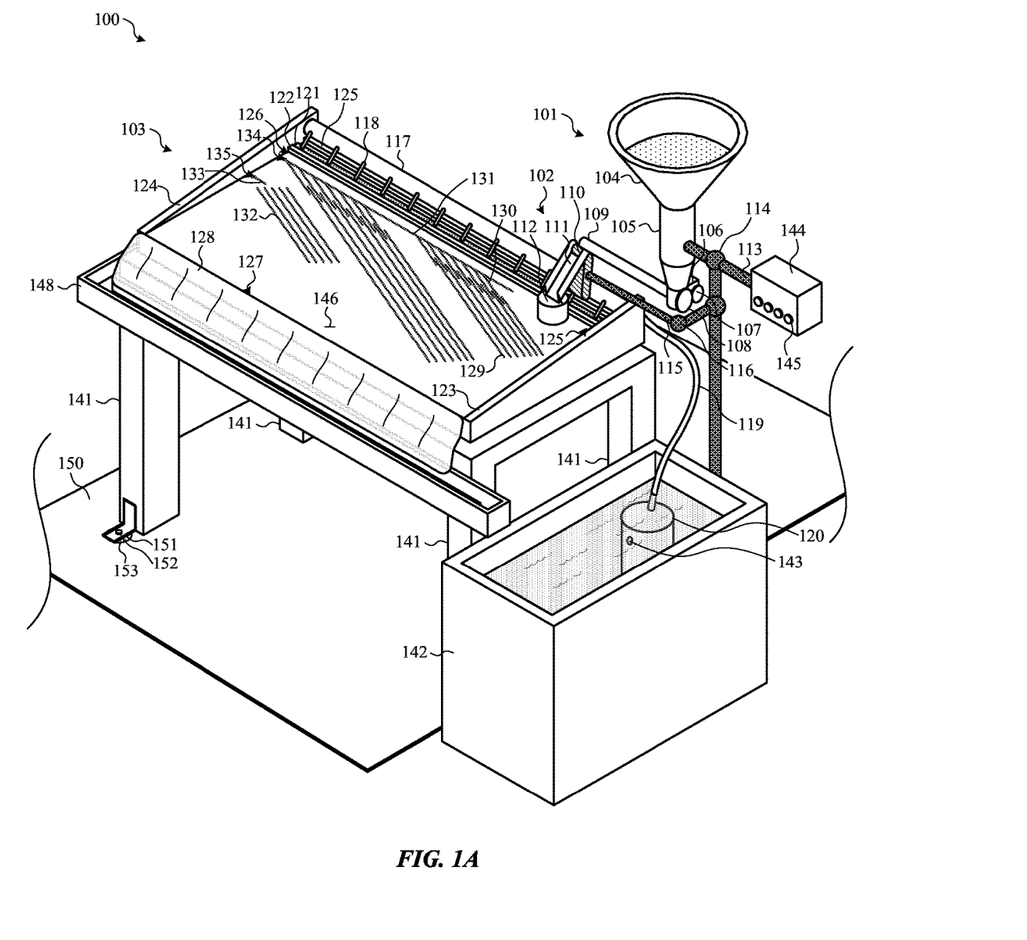
FIG. 1A is an isometric view of an example system for precious metal separation.
Figure 1B:
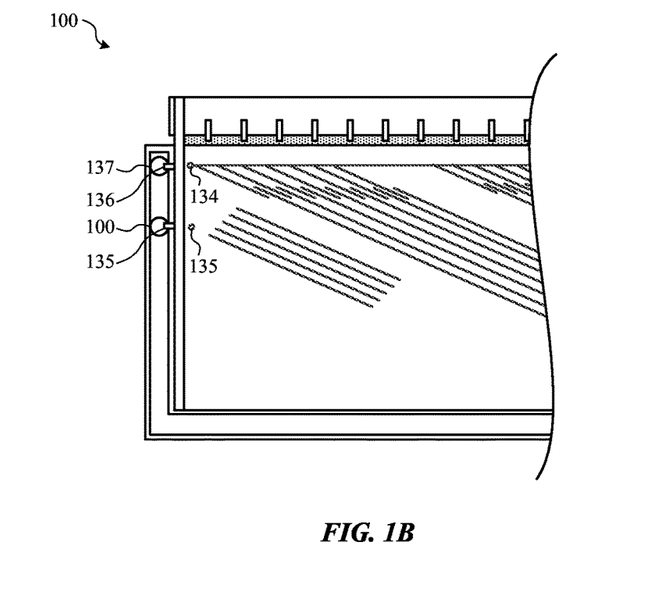
FIG. 1B is a partial top view of the example system of FIG. 1A.

FIG. 1A is an isometric view of an example system 100 for precious metal separation. FIG. 1B is a partial top view of the example system 100 of FIG. 1A. As illustrated in FIGS. 1A and 1B, the example system 100 includes a feeder 101 (or hopper), a remover 102 (or mag remover), and a separator device 103.

In this example, the separator device 103 is illustrated and described as a shaker table. However, it is understood that this is an example. In various implementations the separator device 103 may be any kind of precious metal separator device such as a blue bowl, a sluice box, a gold pan, and/or other such precious metal separator.

Further, the example system 100 will be described in detail below in the context of gold separation. However, it is understood that this is an example. In various implementations, the example system 100 may be utilized to separate any precious metal from a granular mixture such as platinum, silver, copper, and/or other such precious metal.

A granular mixture may be received in an inlet port 104 (which may taper downwards to enable easier receipt of granulated mixture) of the feeder 101 and stored in a storage area 105. The granular mixture may be any mixture including gold particles such as dirt, soil, sand, ground ore, ground circuit boards, and/or other granular mixture. In some cases, the granular mixture may have previously been processed to separate various nonprecious particles from the granular mixture, such as utilizing a sluice box. An outlet port 109 of the feeder 101 may dispense the granular mixture which may then fall or drop in a fall or drop path vertically onto the separator device 103.

As the granular mixture falls from the outlet 109, the granular mixture may fall past the remover 102. The remover 102 may remove magnetic material from the granular mixture as the granular mixture falls. The falling granular mixture that reaches the separator device 103 may then be processed by the separator device 103.

The separator device 103 may process the granular mixture at a particular rate. Such a rate may be based on a variety of factors such as sizes of particles in the mixture, components of the mixture, and/or other such factors. For example, the separator device 103 may process the granular mixture at the rate of 1 tablespoon an hour 100 tablespoons an hour, and/or any other such rate. The feeder 101 may be configured to dispense the granular mixture at the same rate at which the separator device 103 processes. In this way, the separator device 103 may not be underutilized by not having enough granular mixture to process and/or become ineffective by attempting to process more granular mixture at a time than the separator device 103 can effectively process (which may result in lost gold particles).

The outlet port 109 may be a downward angled, rotating tube connected to the storage area 105. The tube may have a gear 108 or similar engagement mechanisms that engages a gear or similar engagement mechanisms 107 of a motor 106. Rotation of the tube, and the speed of the rotation, may thus be controlled and adjusted by adjusting the speed of the motor 106 which turns the gear 107, thereby turning the gear 108 and the tube. The feeder 101 may be moveably coupled to a support 113 via an adjustment knob 114 and the angle of the feeder 101 and therefore the tube may be adjusted by adjusting the adjustment knob 114. The rate at which the feeder 101 dispenses granular mixture may correspond to the rotation speed of the tube, the angle of the tube, and/or various characteristics of the granular mixture. Thus, by adjusting the rotation speed of the tube, the angle of the tube, and/or the granular mixture, the feeder 101 may be made to dispense granular material at the same rate at which the separator device 103 processes the granular mixture. The motor 106 may be electrically coupled to the controller 144 which may include one or more controller knobs 145 for controlling the speed of the motor 106.

Although a particular feeder 101 configuration is illustrated and described, it is understood that this is an example. In various implementations, other feeder 101 configurations may be utilized.

The remover 102 may be positioned adjacent to, but not directly in the fall or drop path of granular material dispensed from the feeder 101 onto the separator device 103. The remover 102 may include a surface 110 to which ferromagnetic material in the granular material is vertically and/or otherwise attracted to as the dispensed granular mixture falls to the separator device 103. Such attraction may be magnetic. The remover 102 may include a number of magnets (or magnetic elements) disposed underneath the surface. Such magnetic elements may be rotatably moveable (i.e., rotating magnetic elements), such as via one or more gears that are rotated by a motor 147 (see FIG. 3), in turn rotating one or more chains attached to the magnets, such that they travel upward on a side of the remover 102 facing the feeder 101 and downward on a side of the remover 102 opposite the feeder 101. The magnets may be rotated at a relatively slow rate of speed such that a good deal of ferromagnetic material is attracted to the surface by a particular magnet before the magnet moves upward. If the rotation is too fast, the ferromagnetic material may stay stuck in one place on the surface as the attraction from a previous magnet is replaced by the attraction from the next magnet. Rotated at a suitable speed, the attracted ferromagnetic material attracted by the magnet may thus move along the surface as the magnetic element moves underneath until the magnet moves downward under a portion of the surface to which a scraper 111 connects, which causes the attracted ferromagnetic material to contact the scraper 111. As shown, this scraper 111 may be a ramp that separates the attracted ferromagnetic material from the surface, breaking the magnetic attraction of the magnet, and guiding the released ferromagnetic material into a collector 112.

The motor 147 may be electrically coupled to the controller 144 and one or more controller knobs 145 may be utilized to control the speed of the motor 147 and thus the rotation speed of the magnets of the remover 102. The remover 102 may be coupled to a support 115 by an adjustment knob 116. Adjustment of the adjustment knob 116 may bring the remover 102 nearer to and/or further from the feeder 101. The amount of ferromagnetic material attracted to the remover 102 may be based on the speed of the rotation of the magnets, the proximity of the remover 102 to the fall path or drop path from the outlet port 109, the rate at which the dispensed granulated mixture falls, the composition and/or size of particles in the mixture. Any number of these factors may be adjusted to increase and/or decrease the amount of ferromagnetic material removed from the mixture before processing by the separator device 103.

As the remover 102 may remove part of the granular mixture, the processing capabilities of the separator device 103 may be increased as that portion of the granular mixture does not need to be processed. This may mean that the separator device 103 is required to process less of the granular mixture. Further, as the separator device 103 may at least partially function by separating materials in the granular mixture by weight, ferromagnetic materials that may weigh similarly to gold particles may be removed and may thus not need to be separated from gold particles once the separator device 103 processes the granular mixture, thus increasing the effectiveness of the separator device 103.

Although a particular remover 102 configuration is illustrated and described, it is understood that this is an example. In various implementations, other remover 102 configurations may be utilized.

As illustrated, in some embodiments the separator device 103 may be a shaker table. Although a shaker table configuration is illustrated and described, it is understood that this is an example. In various implementations, other shaker tables may be utilized. Further, it is understood that the use of a shaker table is an example and that other precious metal separator devices 103 may be utilized in various embodiments without departing from the scope of the present disclosure.

As illustrated in this example embodiment, the shaker table may utilize a combination of differential motion, grooves 129-133, impact, a treated surface 146, and/or other such mechanisms and/or techniques to separate gold particles (which may be collected in receptacles 137 and 138 that may be magnetically mounted to the shaker table in a gutter 148) from nonprecious materials in the dispensed granular mixture (which may be collected in waste receptacle 142).

The shaker table may have a treated surface 146 bounded by walls 123, 124, and 122. The treated surface may be formed of acrylic coated with chalkboard paint (a paint or other coating that may include unsanded grout). Gold and/or other precious metals may not move easily across such a treated surface 146 whereas nonprecious materials such as sand and dirt are unhindered from movement. The treated surface 146 may be angled such that a side 127 is lower than the opposing side and such that a corner 126 is higher than a corner 125. The treated surface 146 may be moveably mounted on a support frame 141 such that the treated surface 146 may oscillate.

The treated surface 146 may be moveably mounted such that the treated surface 146 moves in a first direction at a first speed, experiences and impact, and then travels in a second direction at a second speed. The first direction may be toward the feeder 101 and the second direction may be away from the feeder 101. The first speed may be faster than the second speed (or vice versa). The differential speed and the impact may cause gold particles in the mixture to jump higher on the treated surface 146.

The treated surface 146 may include a first set of grooves 129, a second set of grooves 130, a main collector groove 131, additional grooves 132, and secondary collector groove 133. The first set of grooves 129, the second set of grooves 130, and the additional grooves 132 may all be shallower and/or narrower at portions of the respective grooves closer to the corner 126 and deeper and/or wider at portions of the respective grooves further from the corner 126.

Water and/or other liquid may be dispensed onto the treated surface 146 via a water pipe 117. The water may be provided to the water pipe 117 from a water pump 120 via a conduit 119. The water in the water pipe 117 may be dispensed via needle valves 118 or similar mechanisms that may be positioned within sponge 121 or similar material behind the wall 122. The needle valves 118 may dispense water from the water pipe 117 into the sponge 121 and the water may then overflow the sponge 121 over the wall 122 onto the treated surface 146. Though not shown, the needle valves 118 may have individual and/or group adjustment mechanisms such as knobs operable to control the flow of water from one or more of the needle valves 118. The water pump 120 may be electrically coupled to the controller 144 which may include one or more controller knobs 145 for controlling the speed of the water pump 120. In one or more of these ways, the amount of water and/or the pressure of the water may be adjusted (which may influence the amount of granular material that the shaker table can process in a given period of time).

As the treated surface 146 oscillates and impacts, dispensed granular material dispensed near the corner 125 may spread out. Lighter materials such as some nonprecious materials may be washed down toward the side 127. Heavier materials, such as gold particles and other relatively heavier materials, may jump as a result of the differential motion and impacts. As a result of such jumping, the gold particles and other relatively heavier materials may enter the first set of grooves 129. As the differential motion and impact continue, the gold particles and other relatively heavier materials may travel up the first set of grooves 129 in the direction of the corner 126, eventually exiting the narrower and/or shallower end of the first set of grooves 129. At this point, lighter materials still present may be washed down toward the side 127 as heavier materials (including gold particles) fall into the second set of grooves 130. Similar to the movement through the first set of grooves 129, the differential motion and impacts may move gold particles and other relatively heavier materials still present up toward the narrower and shallower ends of the second set of grooves 130 in the direction of the corner 126. Gold particles, being heavier than other particles remaining, may jump into the main collection groove 131 and may move through a drain 134 into the receptacle 137 via a collector tube 136. Lighter particles still remaining may be washed downward toward the side 127. As a result of such operation, the granular material collected in the receptacle 137 may be entirely and/or primarily gold particles.

However, not all gold particles in the granular mixture may be heavy enough to move into the main groove 131 and thus into the receptacle 137. As a fallback, additional grooves 132 catch material washed down from the secondary grooves 130 not heavy enough to move into the main collector groove 131. Similar to the movement through the first and second set of grooves 129 and 130, the differential motion and impacts may move remaining gold particles and other relatively heavier materials still present up toward the narrower and shallower ends of the additional set of grooves 132 in the direction of the corner 126. Remaining gold particles, being heavier than other remaining particles, may jump into the secondary collection groove 133 and may move through a drain 135 into the receptacle 138 via a collector tube 139. Lighter particles still remaining may be washed downward toward the side 127. As a result of such operation, the granular material collected in the receptacle 138 may be entirely and/or primarily gold particles that would have otherwise been lost.

Although the secondary collection groove 133 is not shown and described as directly connected to the additional set of grooves 132, it is understood that this is an example. In some implementations, the secondary collection groove 133 may extend across the additional set of grooves 132 and may be connected thereto such that remaining gold particles, travel directly from the additional set of grooves 132 into the secondary collection groove 133 before moving through a drain 135 into the receptacle 138.

Portions of the granular material that do not move into either the main collector groove 131 or the secondary collector groove 133, along with dispensed water, may move downward to the side 127 and be directed into a gutter 148 by a rubber sheet 128 and/or other guide element. The gutter 148 may empty into the waste receptacle 142. As illustrated, in some implementations the water from the waste receptacle 142 may be filtered and recycled by the water pump 120 via a connector 143.

Figure 2:
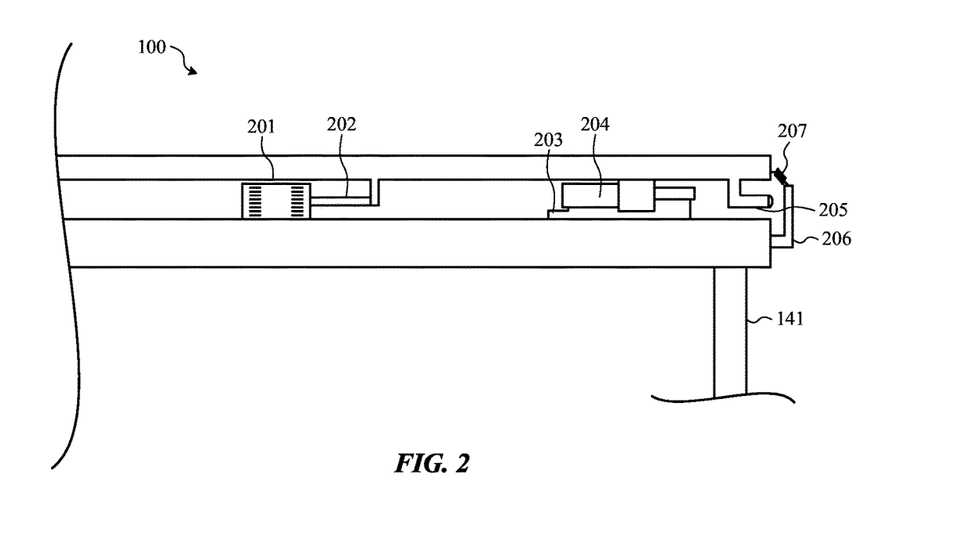
FIG. 2 is a front partial view of the example system of FIG. 1A showing how a surface of a shaker table may be moveably mounted to a support frame.

FIG. 2 is a front partial view of the example system 100 of FIG. 1A showing how a surface of a shaker table may be moveably mounted to a support frame 141 or other support structure. As illustrated, a motor 201 may be coupled to the treated surface 146 by a connection element 202 and the treated surface may be moveably mounted on rails 204 or similar elements by pillow bearing blocks 203 or similar elements. The motor 201 may be electrically coupled to the controller 144 and one or more controller knobs 145 may be utilized to control the speed of the motor 201 and thus movement speed of the shaker table. The motor 201 may be a reciprocating motor that moves the table in the left and right directions as illustrated in the figure. The reciprocating motor 201 may move the treated surface 146 in both directions at differing and/or the same speeds. However, the speed of the movement may be affected by one or more thumper assemblies 205-207.

The thumper assembly 205-207 may include a spring 207 or similar element, an impacter 205 or similar element, and an impact plate 206 or similar element. When the motor 201 moves the treated surface 146 toward the left as pictured, the movement may be slowed by stretching of the spring 207. However, when the motor 201 moves the treated surface 146 towards the right as pictured, the movement may be sped by the contraction of the spring 207. Such rightward motion as illustrated may be halted when the impacter 205 contacts the impact plate 206, causing the above mentioned impact. In this way, the motor 201 and the thumper assembly 205-207 may cooperate to cause the differential movement (oscillation in different directions at different speeds) as well as the impacts.

In some implementations, the support frame 141 may be formed of one or more metal portions. However, in other implementations, the support frame 141 may be formed of other materials, such as wood. Forming the support frame 141 of wood may magnify the oscillation and impact operation of the shaker table.

Further, with reference again to FIG. 1A, the support frame 141 may mounted to a base 150 by L shaped-brackets 151. Rubber bushings 153, such as 1 inch rubber bushings, may be positioned between the L shaped-brackets 151 and the base 150. Such rubber bushings may prevent the shaker table from vibrating excessively, which could cause precious metals to float on the treated surface in a way that impairs operation of the example system 100.

As illustrated, the L shaped-brackets 151 may be attached to the support frame 141 by nut attached bolts 152. Such nut attached bolts 152 may be adjusted to adjust the angle of the support frame 141 and thereby the example system 100 itself. In some implementations, the base 150 may be a wood plank. However, it is understood that this is an example and in various embodiments any kind of base 150 may be used.

Although a mounting configuration 201-204, thumper assembly 205-207, and/or other features of the shaker table are illustrated and described, it is understood that this is an example. In various implementations, other configurations are possible and contemplated without departing from the scope of the present disclosure.

For example, a single particular thumper assembly 205-207 is illustrated and described. However, in various implementations one or more different, same, and/or similar thumper assemblies 205-207 positioned in various configurations may be utilized. Further, a particular mounting configuration 201-204 is illustrated and described. However, in various implementations one or more various kinds of motors, connection elements, and/or other mounting components positioned in various configurations may be utilized.

Figure 3:
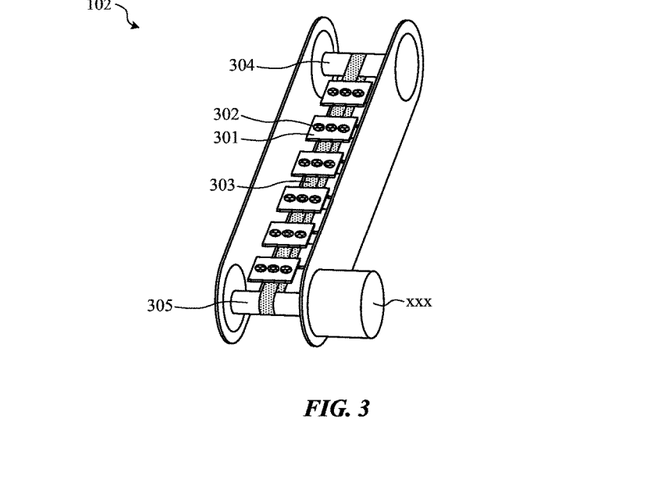
FIG. 3 is a partial close-up view of the remover of FIG. 1A with the remover surface removed to illustrate internal elements.

FIG. 3 is a partial close-up view of the remover 102 of FIG. 1A with the remover surface 110 removed to illustrate internal elements. As illustrated, the motor 147 is operable to turn a gear 305 or similar element which turns a chain 303 or similar element (coupled at an opposing end to a passive gear 304 or similar element). Multiple magnet holders 301 are coupled to the chain 303. Each of the magnet holders 301 hold one or more magnets 302. As the motor 147 turns the gear 305, the chain 303 may rotate the magnet holders 301 and the magnets 302 around the remover 102.

Figure 4:
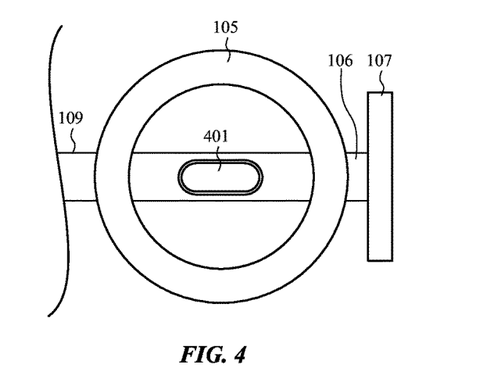
FIG. 4 is a partial top close-up view of the storage area portion of the feeder of FIG. 1A with the inlet port removed to illustrate internal elements.
Figure 5:
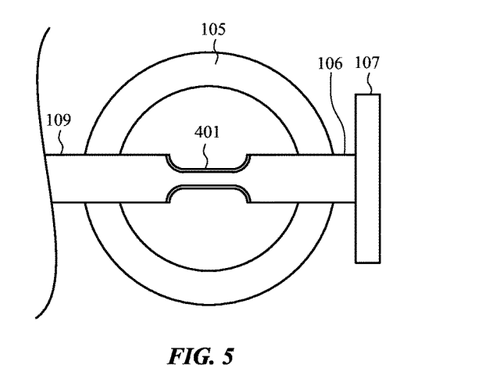
FIG. 5 is a partial view of FIG. 4 with upper portions of the storage area of the feeder removed to further illustrate internal elements.

FIG. 4 is a partial top close-up view of the storage area 105 portion of the feeder 101 of FIG. 1A with the inlet port 104, the motor 106, and the gear 108 removed to illustrate internal elements. As illustrated, a portion of the tube 401 within the storage area includes one or more apertures. As the tube 401 rotates, granular material stored in the storage area may enter the apertures and be dispensed out the inlet port. FIG. 5 is a partial view of FIG. 4 with upper portions of the storage area 105 of the feeder 101 removed to further illustrate internal elements.

Although particular elements have been shown and described above with respect to FIGS. 1-5, it is understood that this is an example. In various implementations, other elements in other configurations may be utilized without departing from the scope of the present disclosure. For example, particular configurations have been shown and described with respect to components of the feeder 101, remover 102, and separator device 103. However, the utilization of different components in different arrangements are possible and contemplated.

Figure 6:
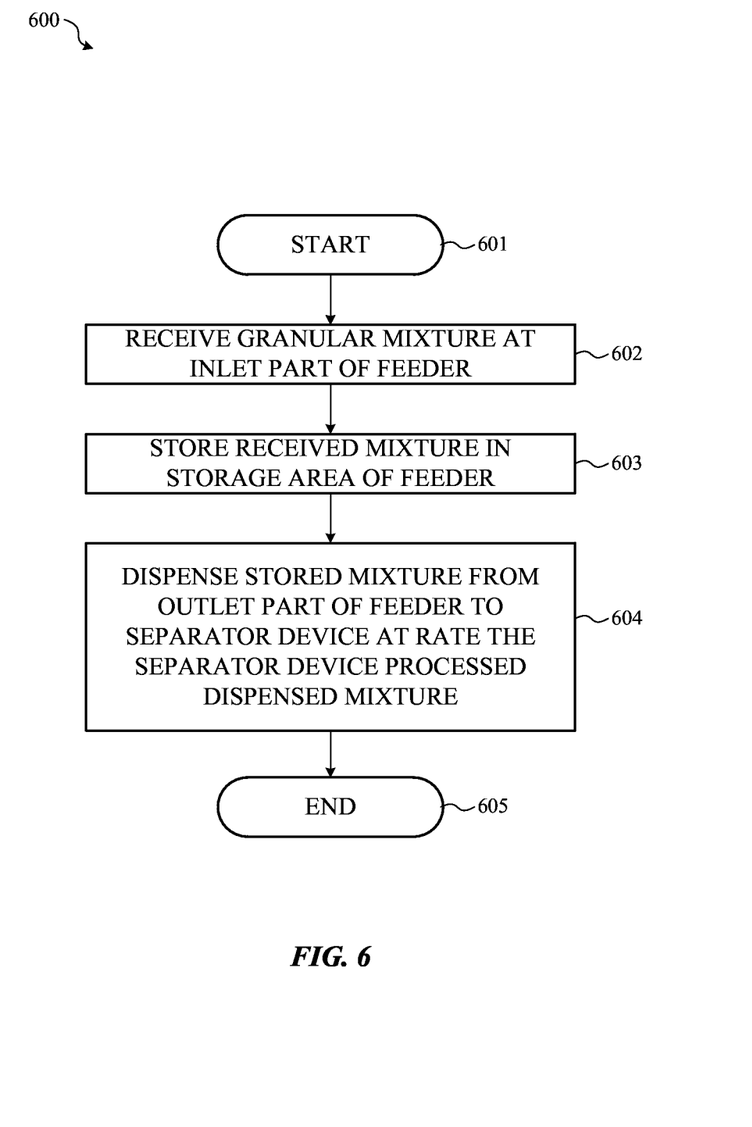
FIG. 6 is a flow chart illustrating a method for feeding a granular mixture to a precious metal separator device. This method may be performed by the example systems of FIGS. 1-5.

FIG. 6 is a flow chart illustrating a method 600 for feeding a granular mixture to a precious metal separator device. This method may be performed by the example systems of FIGS. 1-5.

The flow begins at block 601 and proceeds to block 602 where a granular mixture may be received at an inlet port of a feeder. The flow then proceeds to block 603 where the received mixture may be stored in a storage area of the feeder. Next, the flow proceeds to block 604 where the stored granular mixture may be dispensed from an outlet port of the feeder to a separator device. The granular mixture may be dispensed to the separator device at a rate that the separator device processes the dispensed granular mixture. The flow may then proceed to block 605 and end.

In some cases, the speed at which the granular mixture is dispensed may depend on a rotation speed of a tube that forms the outlet port, a particular downward angle of the tube, the characteristics of the granular mixture, and/or other factors. Such factors may be adjusted in order to match the dispensing rate of the feeder to the processing rate of the separator device.

Although the method 600 is illustrated and described above as including particular operations performed in a particular order, it is understood that this is an example. In various implementations, various orders of the same, similar, and/or different operations may be performed without departing from the scope of the present disclosure.

For example, blocks 602-603 show the operations of receiving and storing the granular mixture as separate, linear operations. However, in various implementations such operations may be performed as a single, united operation.

By way of another example, the method 600 is illustrated and described above as a single, linear series of operations. However, in various implementations the flow may return from block 604 to block 602 and the flow may continue.

Figure 7:
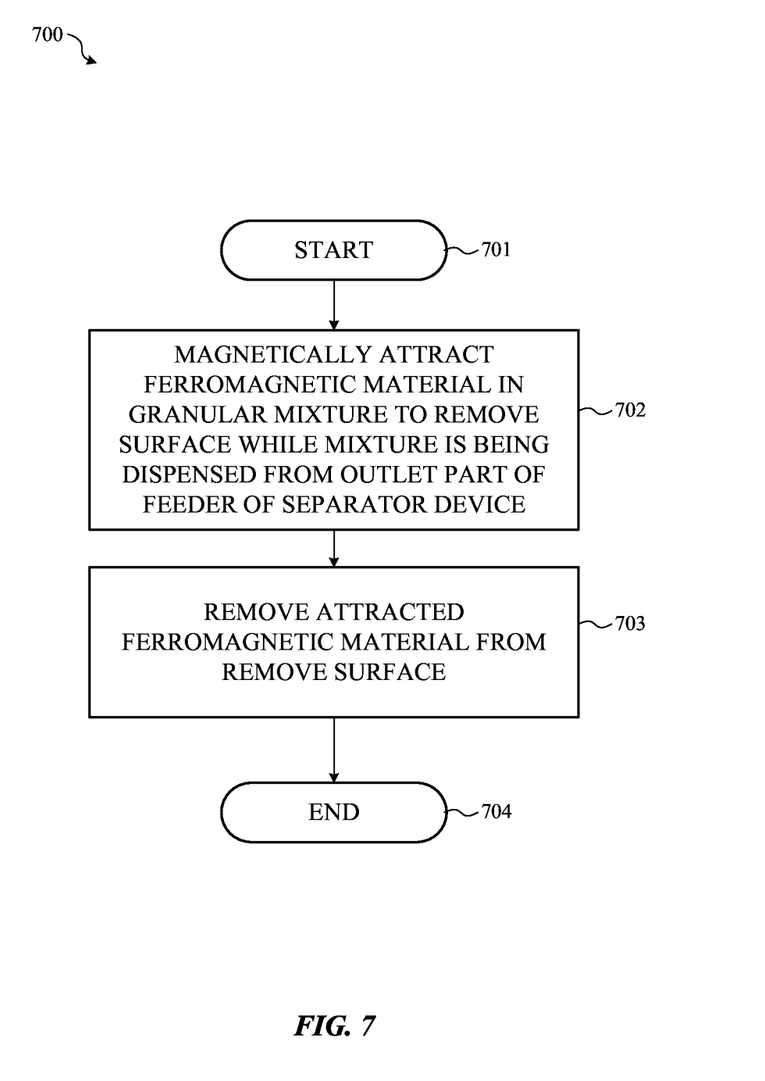
FIG. 7 is a flow chart illustrating a method for separating ferromagnetic material from a granular mixture being fed to a precious metal separator device. This method may be performed by the example systems of FIGS. 1-5.

FIG. 7 is a flow chart illustrating a method 700 for separating ferromagnetic material from a granular mixture being fed to a precious metal separator device. This method 700 may be performed by the example systems of FIGS. 1-5. In some cases, the method 700 may be performed as part of performing the method 600.

The flow begins at block 701 and proceeds to block 702 where ferromagnetic material in a granular mixture may be magnetically attracted to a remover surface while the mixture is being dispensed from an outlet port of a feeder to a separator device. The flow then proceeds to block 703 where the attracted ferromagnetic material may be removed from the remover surface.

Although the method 700 is illustrated and described above as including particular operations performed in a particular order, it is understood that this is an example. In various implementations, various orders of the same, similar, and/or different operations may be performed without departing from the scope of the present disclosure.

For example, blocks 702-703 show the operations of attraction and removal as separate, linear operations. However, in various implementations such operations may be performed as a single, united operation.

By way of another example, the method 700 is illustrated and described above as a single, linear series of operations. However, in various implementations the flow may return from block 703 to block 702 and the flow may continue.

In the present disclosure, the methods disclosed may be implemented utilizing one or more sets of instructions or software readable by a device, such as a computer controlled manufacturing device or a controller. Further, it is understood that the specific order or hierarchy of steps in the methods disclosed are examples of sample approaches. In other embodiments, the specific order or hierarchy of steps in the method can be rearranged while remaining within the disclosed subject matter. The accompanying method claims present elements of the various steps in a sample order, and are not necessarily meant to be limited to the specific order or hierarchy presented.

Methods based on techniques of the described disclosure may utilize a computer program product, or software, that may include a non-transitory machine-readable medium having stored thereon instructions, which may be used to program a computer system (such as computer controlled manufacturing device, a controller, or any other electronic device) to perform a process utilizing techniques according to the present disclosure. A non-transitory machine-readable medium includes any mechanism for storing information in a form (e.g., software, processing application) readable by a machine (e.g., a computer). The non-transitory machine-readable medium may take the form of, but is not limited to, a magnetic storage medium (e.g., floppy diskette, video cassette, and so on); optical storage medium (e.g., CD-ROM); magneto-optical storage medium; read only memory (ROM); random access memory (RAM); erasable programmable memory (e.g., EPROM and EEPROM); flash memory; and so on.

It is believed that the present disclosure and many of its attendant advantages will be understood by the foregoing description, and it will be apparent that various changes may be made in the form, construction and arrangement of the components without departing from the disclosed subject matter or without sacrificing all of its material advantages.

The form described is merely explanatory, and it is the intention of the following claims to encompass and include such changes.

While the present disclosure has been described with reference to various embodiments, it will be understood that these embodiments are illustrative and that the scope of the disclosure is not limited to them. Many variations, modifications, additions, and improvements are possible. More generally, embodiments in accordance with the present disclosure have been described in the context or particular embodiments. Functionality may be separated or combined in blocks differently in various embodiments of the disclosure or described with different terminology. These and other variations, modifications, additions, and improvements may fall within the scope of the disclosure as defined in the claims that follow.

I claim:

1. A system for precious metal separation, comprising:
    a feeder that provides a granular mixture to a precious metal separator device, the feeder comprising:
        an inlet port;
        a storage area connected to the inlet port; and
        an outlet port connected to the storage area;
        wherein the granular mixture falls from the outlet port to the precious metal separator device; and
    a remover that removes ferromagnetic material from the falling granular mixture by horizontally attracting the ferromagnetic material to an unmoving surface of the remover, the remover comprising:
        the unmoving surface;
        a belt; and
        rotating magnetic elements positioned underneath the unmoving surface, the rotating magnetic elements rotate by movement of the belt to which each of the rotating magnetic elements are coupled at a distance from each other;
    wherein the feeder provides the granular mixture to the precious metal separator device at a rate that the precious metal separator device processes the granular mixture.

2. The system of claim 1, wherein the outlet port comprises a rotating tube.

3. The system of claim 2, wherein the feeder provides the granular mixture at least based on a rotation speed of the rotating tube by apertures in the rotating tube positioned in the storage area allowing the granular material to enter the rotating tube from the storage area as the rotating tube rotates.

4. The system of claim 3, wherein the rotation speed of the rotating tube is adjustable.

5. The system of claim 4, wherein the rotation speed of the rotating tube is adjustable by adjusting a speed of at least one motor that rotates the rotating tube.

6. The system of claim 1, wherein the outlet port comprises a tube that angles downward from the storage area.

7. The system of claim 6, wherein the provides the granular mixture at least based on an angle of the tube.

8. The system of claim 7, wherein the angle of the tube is adjustable.

9. The system of claim 1, wherein the belt is a chain.

10. The system of claim 1, wherein the rotating magnetic elements are coupled around an entire perimeter of the belt.

11. The system of claim 1, wherein each of the rotating magnetic elements are an equivalent distance from the unmoving surface.

12. The system of claim 1, wherein a proximity of the unmoving surface to the falling granular mixture is adjustable.

13. The system of claim 1, wherein each of the rotating magnetic elements comprise multiple magnets held by a magnet holder.

14. The system of claim 1, wherein rotation of the rotating magnetic elements moves attracted ferromagnetic material along the unmoving surface away from a fall path of the falling granular mixture.

15. The system of claim 1, wherein movement of the attracted ferromagnetic material along the unmoving surface causes the attracted ferromagnetic material to contact a scraper that removes the attracted ferromagnetic material from the unmoving surface by breaking magnetic attraction of the attracted ferromagnetic material.

16. The system of claim 1, wherein the precious metal separator device comprises a shaker table.

17. The system of claim 16, wherein the shaker table is operable to move in a first direction at a first speed, experience at least one impact, and move in a second direction at a second speed.

18. The system of claim 16, wherein the shaker table is moveably mounted to a support structure by one or more rails and pillow bearing blocks.

19. The system of claim 1, wherein the belt is rotated by a motor.

20. The system of claim 1, wherein rotation of the rotating magnetic elements moves attracted ferromagnetic material along the unmoving surface in a direction opposite that of a fall path of the falling granular mixture.

* * * * *